United States Patent
Jia

(10) Patent No.: US 12,088,754 B2
(45) Date of Patent: Sep. 10, 2024

(54) METHOD FOR CONTROLLING MOBILE TERMINAL, AND MOBILE TERMINAL

(71) Applicant: BEIJING XIAOMI MOBILE SOFTWARE CO., LTD., Beijing (CN)

(72) Inventor: Yongqiang Jia, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 339 days.

(21) Appl. No.: 17/576,638

(22) Filed: Jan. 14, 2022

(65) Prior Publication Data
US 2022/0286550 A1 Sep. 8, 2022

(30) Foreign Application Priority Data
Mar. 4, 2021 (CN) .......................... 202110240813.8

(51) Int. Cl.
*H04M 1/72454* (2021.01)
*H04M 1/72463* (2021.01)
*H04M 1/72469* (2021.01)

(52) U.S. Cl.
CPC ... *H04M 1/72454* (2021.01); *H04M 1/72463* (2021.01); *H04M 1/72469* (2021.01)

(58) Field of Classification Search
CPC ......... H04M 1/72454; H04M 1/72463; H04M 1/72469; G06F 1/1652; G06F 1/1677; G06F 1/1681; G06F 3/0416; G06F 3/0488; G06F 3/04883
USPC ........................................................ 455/428
See application file for complete search history.

(56) References Cited

U.S. PATENT DOCUMENTS

| | | | | |
|---|---|---|---|---|
| 2020/0073446 A1* | 3/2020 | Wu | ................ | G06V 40/13 |
| 2020/0264826 A1* | 8/2020 | Kwon | ................ | G06F 1/1616 |
| 2022/0413553 A1* | 12/2022 | Zhang | ................ | G06F 1/1686 |
| 2023/0185508 A1* | 6/2023 | Chung | ................ | G06F 1/1677 |
| | | | | 715/761 |

FOREIGN PATENT DOCUMENTS

| | | |
|---|---|---|
| CN | 105159496 A | 12/2015 |
| CN | 108459797 A | 8/2018 |
| CN | 109274823 A | 1/2019 |
| CN | 109492178 A | 3/2019 |
| CN | 109871147 A | 6/2019 |
| CN | 110545354 A | 12/2019 |
| CN | 110837318 A | 2/2020 |
| CN | 111752465 A | 10/2020 |

(Continued)

OTHER PUBLICATIONS

Folding State Recognition for Multi-Foldable Mobile Devices; Shuo-Han Chen; IEEE, 2 pages document; 2017 (Year: 2017).*

(Continued)

*Primary Examiner* — Hirdepal Singh
(74) *Attorney, Agent, or Firm* — Arch & Lake LLP

(57) ABSTRACT

The present disclosure provides a method and an apparatus for controlling a mobile terminal, a mobile terminal and a storage medium. The method is applied to the mobile terminal with a touch screen and includes: detecting whether the mobile terminal is in a folding process of switching from an unfolded posture to a folded posture; and disabling, in response to detecting a touch event acting on the touch screen during the folding process, a response to the touch event.

17 Claims, 6 Drawing Sheets folding the mobile terminal with the thumb pressed on the screen →  determining the folding rate →  cancelling App/ system event

(56) References Cited

FOREIGN PATENT DOCUMENTS

| | | | |
|---|---|---|---|
| CN | 112269555 A | | 1/2021 |
| CN | 112416060 A | | 2/2021 |
| CN | 113330399 A | * | 8/2021 |
| EP | 3699738 A1 | | 8/2020 |

OTHER PUBLICATIONS

For (CN 113330399) (Year: 2021).*
Chen (Folding State Recognition for Multi-Foldable Mobile Devices; IEEE 2017) (Year: 2017).*
Extended European Search Report of EP Application No. 22152600.7 dated Jul. 13, 2022, (8p).
The First CNOA issued in Application No. 202110240813.8 dated Mar. 13, 2024 with English translation, (23p).

* cited by examiner

METHOD FOR CONTROLLING MOBILE TERMINAL, AND MOBILE TERMINAL

CROSS REFERENCE

This application is based upon and claims priority to Chinese Patent Application No. 202110240813.8, filed on Mar. 4, 2021, the entire content of which is incorporated herein by reference for all purposes.

TECHNICAL FIELD

The present disclosure relates the field of electronic technology, and in particular to a method and apparatus for controlling a mobile terminal, a mobile terminal, and storage medium.

BACKGROUND

With the development of electronic technology, foldable mobile terminals have emerged. Accordingly, the mobile terminals will be in different application states such as the folded and unfolded postures.

In the actual use of a mobile terminal by the user, a relatively high number of accidental touches will occur, and the probability of a false response to a touch event is particularly prominent during use.

SUMMARY

The present disclosure provides a method and apparatus for controlling a mobile terminal, a mobile terminal, and a storage medium.

According to a first aspect of the present disclosure, there is provided a method for controlling a mobile terminal, applied to the mobile terminal with a touch screen. The method includes: detecting whether the mobile terminal is in a folding process of switching from an unfolded posture to a folded posture; and disabling, in response to detecting a touch event acting on the touch screen during the folding process, a response to the touch event.

According to a second aspect of the present disclosure, there is provided a mobile terminal, including: a memory for storing one or more executable instructions for a processor; and the processor connected to the memory. The processor is configured to implement the method for controlling the mobile terminal provided in the first aspect.

According to a third aspect of the present disclosure, there is provided a non-transitory computer readable storage medium. When one or more instructions in the storage medium are executed by a processor of a computer, the computer is allowed to execute the method for controlling the mobile terminal provided in the first aspect.

BRIEF DESCRIPTION OF THE DRAWINGS

The accompanying drawings herein are incorporated into and form part of this description, illustrate examples consistent with this disclosure, and are used with the description to explain the principles of this disclosure.

DETAILED DESCRIPTION

Figure 1:
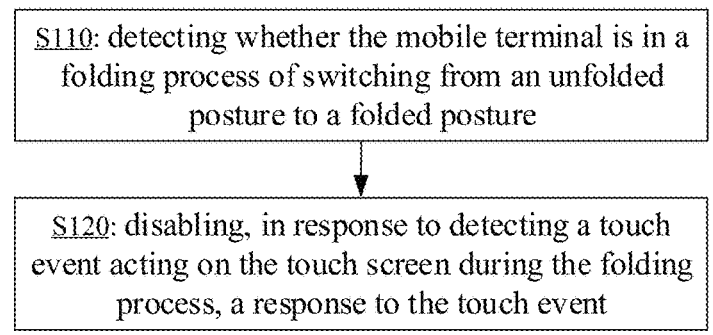
FIG. 1 illustrates a flowchart of a method for controlling a mobile terminal according to one or more examples of the present disclosure.

Exemplary embodiments will be described in detail herein, examples of which are represented in the accompanying drawings. In the following description relating to the accompanying drawings, unless otherwise indicated, the same numerals in the different accompanying drawings indicate the same or similar elements. The implementations described in the following exemplary embodiments do not represent all embodiments that are consistent with the present disclosure. Rather, they are only examples of methods and devices that are consistent with some aspects of the present disclosure, as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

As shown in FIG. 1, the present disclosure provides a method for controlling a mobile terminal, including: S110, detecting whether the mobile terminal is in a folding process of switching from an unfolded posture to a folded posture; and S120, disabling, in response to detecting a touch event acting on the touch screen during the folding process, a response to the touch event.

In the examples of the present disclosure, the mobile terminal includes, but is not limited to, a foldable mobile phone, a foldable tablet computer, a two-in-one device of a tablet and a notebook, a foldable e-reader, or a wearable device, etc.

In some examples, the mobile terminal is a foldable flexible device or a non-flexible device with a folding function provided.

For example, the mobile terminal is provided with multiple screens, and two adjacent screens may be connected by a rotating shaft module such as a rotating shaft or a hinge.

For another example, the mobile terminal is provided with a larger flexible screen. Of course, a rotating shaft assembly may also be provided in the mobile terminal with the flexible screen to assist the bending of the flexible screen and provide a supporting force after the flexible screen is bent.

In one example, various sensors are provided on the mobile terminal, and these sensors can detect whether the mobile terminal is switched between the folded posture and the unfolded posture. These sensors may be dedicated to detecting the posture of the mobile terminal.

In another example, the mobile terminal includes a flexible screen, and the flexible screen is a touch screen. Capacitive arrays for detecting touch are distributed on the touch screen, and the flexible screen, when bent and unfolded, will cause the mutual coupling between the capacitors in the capacitor array at the bending position to change. Therefore, the capacitance value, generated by the mutual coupling between the adjacent capacitors in the capacitor arrays, in the touch screen, can be used for detecting whether the mobile terminal is switching its posture between the folded and unfolded postures.

In one example, S110 may include: determining, in response to detecting within a preset duration that a folding angle between two foldable parts of the mobile terminal is reduced by a preset value, that the mobile terminal is in the folding process of switching from the unfolded posture to the folded posture; or determining, in response to not detecting within the preset duration that the folding angle is reduced by the preset value, that the mobile terminal is not in the folding process.

In one example, the preset duration may be any preset time value, for example, a value of 1 second, 0.5 seconds, or 2 seconds, etc.

In another example, the preset duration may be determined based on the statistical duration of the mobile terminal when the switch between the unfolded posture and the folded posture is successful. For example, the mobile terminal switches from the folded posture to the unfolded posture, or from the unfolded posture to the folded posture, usually taking a duration denoted as A, then the preset duration may be A or B*A, where B is a positive number less than 1. B may be 0.2, 0.1, 0.5, 0.05, 0.03 or 0.02, etc. The preset angle value corresponding to the switch may be B*180 degrees or B*360 degrees. 180 degrees may be the maximum angle for the mobile terminal to switch from the fully folded posture to the fully expanded posture.

It should be understood that the folded posture includes a fully folded posture and a half-folded posture; and the unfolded posture may include a fully expanded posture and a half-expanded posture.

In the fully folded posture, the angle between the two foldable parts of the mobile terminal is 0 degree. In the fully expanded posture, the angle between the two foldable parts of the mobile terminal is 180 degrees. In the half-expanded posture, the angle between the two foldable parts of the mobile terminal is between 180 degrees and the first angle, for example, the first angle may be 160 degrees, 155 degrees, 145 degrees, or 150 degrees. In the half-folded posture, the angle between the two foldable parts of the mobile terminal is between 180 degrees and the second angle, for example, the second angle may be 30 degrees, 20 degrees, or 30 degrees.

In one example, the folding process of switching the mobile terminal from the unfolded posture to the folded posture may include: switching the mobile terminal to a half-folded posture or a fully folded posture at least through a half-expanded posture.

In one example, if the mobile terminal is in the fully expanded posture, the exposed outer surface of the mobile terminal is the largest; if the mobile terminal is in the fully folded posture, it can be considered that at least part of one surface of the mobile terminal is hidden. It should be understood that if the mobile terminal is foldable, the outer surface of the circuit of the mobile terminal can be considered to be minimal when the mobile terminal is in the folded posture.

In the examples of the present disclosure, the touch event may be a pending event triggered by any touch operation on the touch screen.

The touch operation may include touch down, touch move, and/or touch up, etc. The touch operation can be any click operation and/or swipe operation.

Figure 2:
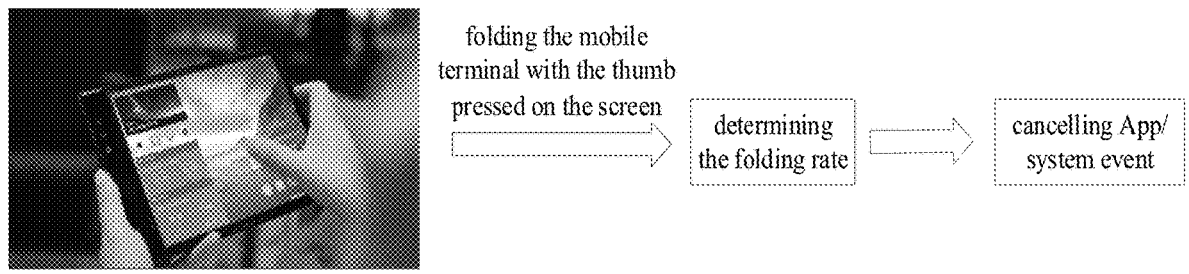
FIG. 2 illustrates a schematic diagram of an effect and flow chart for detecting a touch event according to one or more examples of the present disclosure.

As shown in FIG. 2, during the folding process of the mobile terminal, the user may hold the touch screen, which may cause a false response. In FIG. 2, the user is folding the mobile terminal with the thumb pressed in the middle of the touch screen, and this pressing operation of the thumb will cause a touch event which, if responded to, it no actually what the user wants. In view of this, in the examples of the present disclosure, the response to the touch event detected during the folding process in the mobile terminal is prohibited, thereby reducing unnecessary responses caused when the mobile terminal is folded by holding the touch screen and reducing the rate of false responses.

Figure 3:
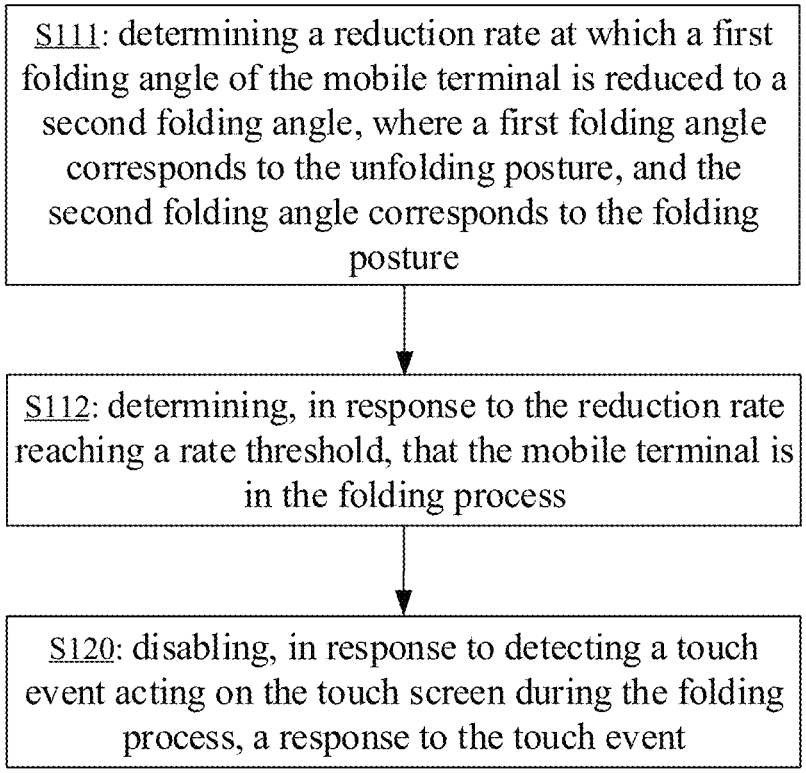
FIG. 3 illustrates a flowchart of a method for controlling a mobile terminal according to one or more examples of the present disclosure.

In one example, as shown in FIG. 3, S110 may include as follows.

S111, determining a reduction rate at which a first folding angle of the mobile terminal is reduced to a second folding angle, wherein a first folding angle corresponds to the unfolding posture, the second folding angle corresponds to the folding posture, and the first folding angle is greater than the second folding angle.

S112, determining, in response to the reduction rate reaching a rate threshold, that the mobile terminal is in the folding process.

In one example, the folding angle when the mobile terminal is in the fully expanded state is 180 degrees, and the folding angle when the mobile terminal is in the fully folded state is 0 degree, then the folding angel is reduced by 180 degrees during the folding process of switching by the mobile terminal from the unfolded posture to the folded posture.

The reduction rate at which the folding angle is reduced may be the reduction value of the folding angle of the mobile terminal per unit length of time. The reduction rate at which the folding angle is reduced may also be understood as the rate of folding. Referring to FIG. 2, if it is determined that the folding rate of the mobile terminal reaches the rate threshold, the application (App) event or system event will be cancelled. Here, the App/system events are divided according to whether the response body of the touch event is the App or the operating system, and both the App event and the system event are the above-mentioned touch events.

When the reduction rate reaches the rate threshold, it can be considered that the mobile terminal is in the folding process of switching from the unfolded posture to the folded posture.

In one example, the mobile terminal further includes a rotating shaft module and a sensing module provided on the rotating shaft module; and the rotating shaft module is configured to switch by the mobile terminal from the unfolded posture and the folded posture.

Determining the reduction rate at which the folding angle of the mobile terminal is reduced includes: monitoring a folding angle of the rotating shaft module detected by the sensing module; and determining the reduction rate according to an angle difference between at least two monitored folding angles and a time difference between monitoring moments of the at least two monitored folding angles.

In some examples, the rotating shaft module may be any component capable of providing relative rotation of the two foldable parts, for example, a hinge or a single rotating shaft including an axis and a shaft sleeve.

The sensing module is located on the rotating shaft module, and can detect the folding angle of the mobile terminal based on the movement of the rotating shaft module. Different folding angles correspond to different postures of the mobile terminal.

Therefore, in some examples, S110 may include: monitoring the folding angle of the rotating shaft module detected by the sensing module; and determining the reduction rate at which the folding angle of the mobile terminal is reduced according to the angle difference between at least two monitored folding angles and the time difference between monitoring moments of the at least two monitored folding angles.

Based on the folding angle detected by the sensing module (e.g., sensor) on the rotating shaft module, it is determined whether the mobile terminal is switched between the folded posture and the unfolded posture, which is simple and accurate to implement.

Figure 4:
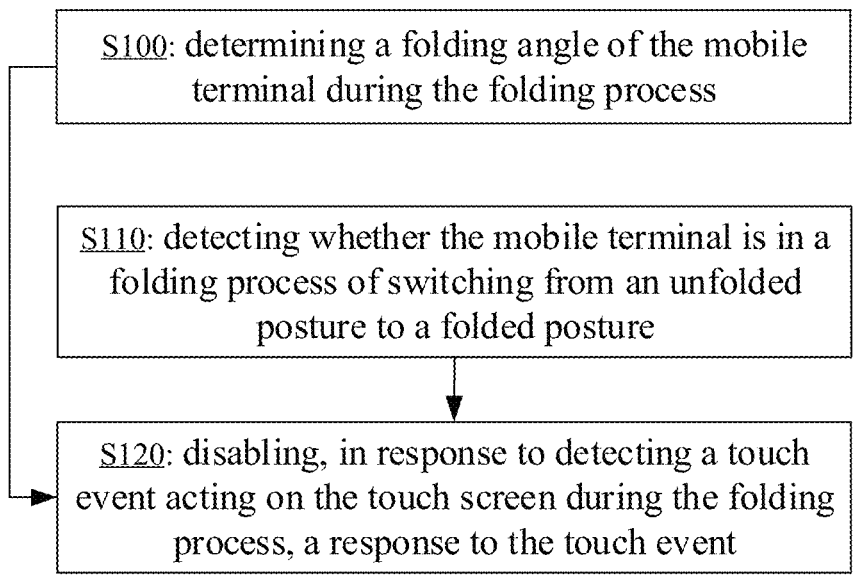
FIG. 4 illustrates a flowchart of a method for controlling a mobile terminal according to one or more examples of the present disclosure.

In some examples, as shown in FIG. 4, the method further includes: S100, determining a folding angle of the mobile terminal during the folding process.

S120 may include: disabling, in response to detecting the touch event acting on the touch screen upon the folding angle of the mobile terminal being less than or equal to an angle threshold during the folding process, the response to the touch event.

If it is determined that the mobile terminal is in the folding process of switching from the unfolded posture to the folded posture, and a touch operation is detected and a corresponding touch event is generated when the current folding angle is less than or equal to the angle threshold, then this touch event is blocked to disable a response to the touch event. In this way, it is possible to reduce the unnecessary prohibition of touch events to which the user needs to respond, and to improve the accuracy of the touch response, when the mobile terminal is in the folding process and the user simply wants to adjust the folding angle in the unfolded posture.

In some examples, the angle threshold may be 25 degrees, 30 degrees or 40 degrees, 60 degrees or 75 degrees, and so on.

In some examples, the touch event includes at least one of the following: an application startup event triggered by a touch operation acting on an application icon in a desktop of the touch screen; an application service event triggered by a touch operation acting on an application control in an application interface of the touch screen; a shortcut touch event triggered by a shortcut gesture acting on the touch screen.

If the application startup event that acts on the application icon is disabled, the application corresponding to the touched application icon will not be started.

If one or more controls in the application interface are touched, the corresponding application service event will not be responded to after the controls in the application are touched. The application service events include, but are not limited to page turning events within the application interface, OK events or cancel events for dialog boxes within the application interface, etc.

The interface on which the shortcut gesture acts may be the desktop and/or any application interface or a smart assistant interface. The shortcut gestures include, but are not limited to: swipe up, swipe down, swipe left or swipe right, etc.

The shortcut touch events corresponding to these shortcut gestures are also the touch events that need to be disabled during the folding of the mobile terminal.

The above description describes only examples of the touch event, which can be of various types when implemented.

Figure 5:
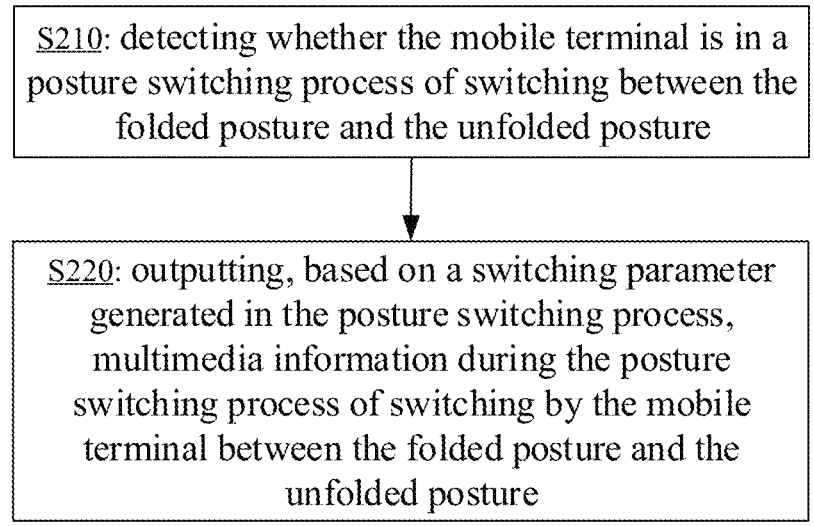
FIG. 5 illustrates a flowchart of a method for controlling a mobile terminal according to one or more examples of the present disclosure.

As shown in FIG. 5, the examples of the present disclosure provide a method for controlling a mobile terminal, which may include as follows.

S210, detecting whether the mobile terminal is in a posture switching process of switching between the folded posture and the unfolded posture.

S220, outputting, based on a switching parameter generated in the posture switching process, multimedia information during the posture switching process of switching by the mobile terminal between the folded posture and the unfolded posture.

The method for controlling the mobile terminal provided by the examples of the present disclosure can be implemented separately or in combination with the aforementioned method for controlling the mobile terminal. For example, when the method for controlling the mobile terminal shown in FIG. 5 is implemented in combination with the method for controlling the mobile terminal described in any of the foregoing examples (e.g., the method for controlling the mobile terminal shown in FIG. 1), the method for controlling the mobile terminal provided in the foregoing examples (i.e., the method for controlling the mobile terminal illustrated in any one of FIGS. 1 to 4), may further include: outputting, based on the switching parameter generated in the posture switching process, multimedia information during the posture switching process of switching by the mobile terminal between the folded posture and the unfolded posture.

That is, in the disclosed examples, in order to improve the intelligence and user experience of the mobile terminal, multimedia information will be output during the process of switching between the folded posture and the unfolded posture of the mobile terminal. The multimedia information here includes information on video, animation, and/or audio, etc.

The switching parameter may be various parameters characterizing or indicating the switching of the mobile terminal between folded and unfolded posture, for example, the switching rate, the switching direction, or the external forces on the mobile terminal when switching.

Exemplarily, outputting the multimedia information based on the switching parameter generated in the posture switching process includes: playing, according to a switching rate during the posture switching process, a switching animation on the touch screen at a playback rate corresponding to the switching rate; or outputting, according to the switching rate during the posture switching process, a beep at the playback rate corresponding to the switching rate.

In this way, the user will fold or unfold the mobile terminal with the switching animation or beep at a corresponding playback rate, thereby enhancing the user experience.

Exemplarily, the playback rate and the switching rate may be positively correlated, specifically: there is a linear relationship between the switching rate and the playback rate.

The multimedia is played at a standard playback rate with a first duration, and the first duration may correspond to the duration required for the mobile terminal to perform a complete folding or unfolding between a fully folded posture and a fully expanded posture at a standard switching rate.

If it is detected that the current switching rate of the mobile terminal is different from the standard playback rate, the standard playback rate is adjusted according to the current switching rate to obtain the playback rate of the multimedia corresponding to the multimedia information currently output.

Exemplarily, the ratio of the current switching rate to the standard switching rate may be equal to the current playback rate and the standard playback rate. Based on the equal relationships, the current playback rate for playing the multimedia can be quickly and conveniently obtained.

In some examples, S220 may include: playing, during an unfolding process of switching by the mobile terminal from the folded posture to the unfolded posture, the switching animation on the touch screen at a playback rate corresponding to an unfolding rate of the mobile terminal.

The touch screen can be lighted up during the unfolding process, so that the touch screen can display the screen of the switching animation. At the same time, the speaker of the mobile terminal can also output the animation sound included in the switching animation. In this way, the user experience is enhanced visually and/or aurally.

In some examples, outputting, according to the switching rate during the posture switching process, the beep at the playback rate corresponding to the switching rate includes: outputting, during the folding process of switching by the mobile terminal from the unfolded posture to the folded posture, the beep at a playback rate corresponding to a folding rate of the mobile terminal.

During the folding process when the mobile terminal is switched from the unfolded posture to the folded posture, the touch screen of the mobile terminal slowly closed and the user may not see the display, so the user can be prompted by the beep only. The beep can be a song or a ringtone, etc., and the specific form of the beep is not limited.

In some examples, the switching modes of the mobile terminal include a first mode and a second mode. In the first mode, the mobile terminal outputs the multimedia information during the posture switching between the folded posture and the unfolded posture. In the second mode, the mobile terminal does not output the multimedia information during the posture switching between the folded posture and the unfolded posture.

In some examples, the method further includes: determining a current switching mode of the mobile terminal.

The determination of the current switching mode of the mobile terminal includes at least one of the following.

The current switching mode of the mobile terminal is determined according to the configuration information of the mobile terminal.

The current switching mode of the mobile terminal is determined according to the historical use of the switching mode of the mobile terminal. For example, if the user prefers to use the first mode according to statistical data, the first mode is determined as the current switching mode of the mobile terminal; otherwise, the second mode may be determined as the current switching mode of the mobile terminal.

The current switching mode of the mobile terminal is determined according to the scene information of the current location of the mobile terminal. For example, the mobile terminal is currently in a conference room, office or reading room, it can be determined that the current switching mode of the mobile terminal is the second mode; otherwise, the first mode may be determined as the current switching mode of the mobile terminal.

In the following description, the method is illustrated using a foldable mobile phone as an example of the aforementioned foldable mobile terminal. The screen of the foldable mobile phone meets the folding characteristics and is therefore able to fold and is called a foldable screen.

In the use of a mobile phone with a foldable screen, when the user folds the mobile phone, there is no clear focus point. Some users may press the edge position of the mobile phone with their thumb to fold, and some users may press the screen with their thumb to fold. For users, the latter undoubtedly more convenient, however, it can also lead to the problem of accidental touches, as if APP is tapped when pressed, it will initiate APP, which is not the desired action. If a button of the User Interface (UI) in the APP is pressed, the APP key response will be triggered, thus affecting the user experience when using foldable screen. On the other hand, during the activation process of the mobile phone with the foldable screen, the screen display state changes from black screen to bright screen, the transition is monotonous, and the interactive animation and sound corresponding to the activation process are lacking. In this regard, the user experience can be optimized by the method for controlling the mobile terminal provided in the present disclosure.

During the process of folding the mobile phone with the foldable screen from unfolding to folding, the user needs to fold the phone with both hands, and during the folding process, the screen needs to be pressed with the thumb, otherwise there is no point of force to fold the phone. If this force point is on the screen, it is easy to trigger an accidental touch.

In addition, the whole process from folding to unfolding is too monotonous. By setting the playback sound and animation of the unfolding process to make the whole process more user-friendly.

The examples of the present disclosure provide solutions to the problem of accidental touch during the folding process of the mobile phone with the foldable screen, which also provides an animation or sound for the process of switching between the folded and unfolded posture.

In some examples, when the user folds the phone, his/her finger touches the screen and folds it. If the APP is tapped and the folding speed is greater than the preset threshold at this point, then the APP will not be initiated. If the APP is not tapped and the folding speed is greater than the preset threshold at this point, then no shortcut gesture will be triggered.

Figure 6A:
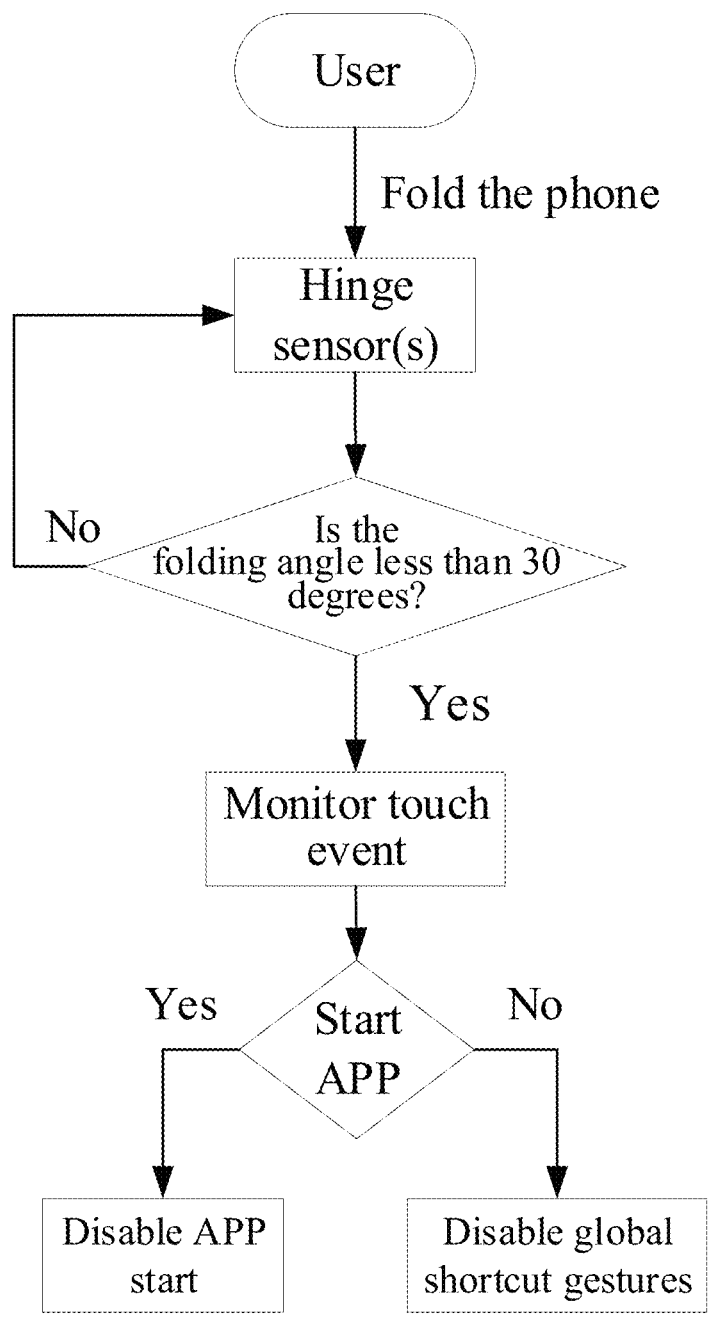
FIG. 6A illustrates a flowchart of a method for controlling a mobile terminal according to one or more examples of the present disclosure.

Referring to FIG. 6A, the method for controlling the mobile terminal provided by the examples of the present disclosure may include as follows.

The user folds the phone.

The hinge sensor(s) in the foldable parts of the mobile phone detect(s) the folding angle.

The hinge sensor(s) determine(s) whether the folding angle is less than 30 degrees. If the folding angle is equal to or greater than 30 degrees, return to the step of detecting the folding angle by the hinge sensors. If the folding angle is less than 30 degrees, the mobile terminal is in the process of folding, as the folding angle is less than 30 degrees it means that the mobile terminal will soon be in a fully folded posture, so the touch event of the touch screen starts to be monitored.

The mobile terminal determines whether the monitored touch event is an APP startup event. If the monitored touch event is the APP startup event, the mobile terminal disables APP start. If the monitored touch event is not the APP startup event, the mobile terminal disables global shortcut gestures.

In addition, during the process of unfolding the phone, the opening sound is played while the opening animation is displayed on the screen. When the speed of unfolding the phone is accelerated, the animation and sound playback will be appropriately accelerated; when the speed of unfolding the phone is slow down, the animation and sound playback will be appropriately slowed down.

If the mobile terminal is provided with two screens, the two screens are the main screen and the auxiliary screen respectively, the display area of the auxiliary screen may be smaller than the main screen. The switching animation mentioned in any example of the present disclosure can be played on the main screen, but is not limited to being played on the main screen.

For the setting of the opening animation and sound, the user can select different opening animations and sounds in the setting interface, which can also be customized.

In the example of the present disclosure, the opening animation is one of the aforementioned switching animations.

During folding the phone by the user, the hinge sensor(s) of the foldable screen obtain(s) the folding angle of the screen.

When the hinge sensor(s) detect(s) a change in the folding angle, the mobile phone monitors an input on the screen to detect a touch operation.

When monitoring the APP is clicked, the phone determines whether the folding speed is greater than the preset threshold at this time. The preset threshold is the folding angle per millisecond. If the folding speed is greater than the preset threshold, the APP will not be launched.

When monitoring the APP is not clicked, the phone determines whether the folding speed is greater than the preset threshold at this time. If it is greater than the preset threshold, the shortcut gestures related to the input are disabled.

Of course, this touch event (i.e., clicking on the APP) is not limited to initiating the APP.

The complete touch process of a touch operation includes: touch down, touch move, and touch up. These events in the folding process should be cancelled, whether it is a system event or an App touch event. The playback rates of the animation frame and sound are recalculated based on the linear mapping of the pending playback time of the picture and sound to the pending unfolding angle (increased folding angle), and the recalculated frame and sound playback rate are constrained to the maximum and minimum frame rate and maximum and minimum rate, respectively, and the opening animation and sound are played according to the recalculated rates.

An opening animation and sound selection interface, as well as the option to upload videos and sounds locally, can be added in the settings interface, allowing users to set the opening animation and sound according to their preferences.

Figure 6B:
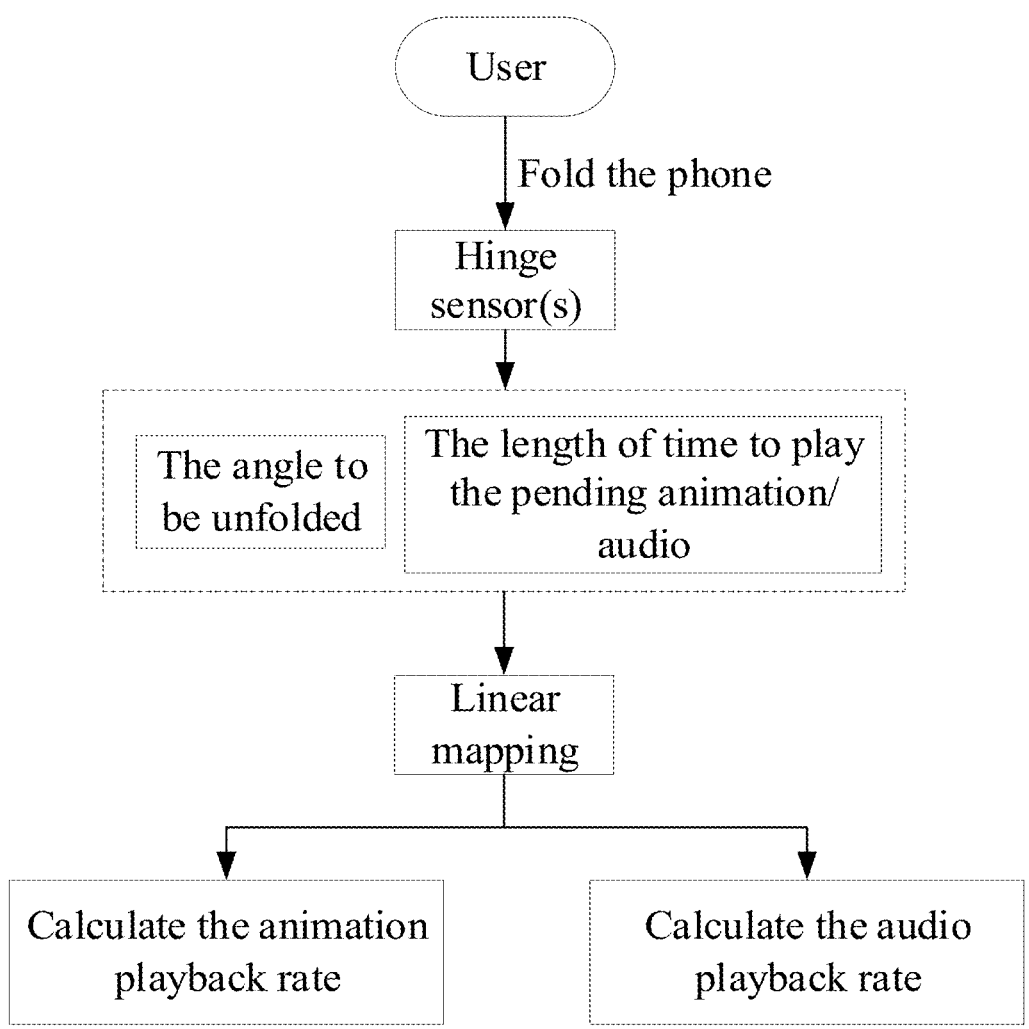
FIG. 6B illustrates a flowchart of a method for controlling a mobile terminal according to one or more examples of the present disclosure.

As shown in FIG. 6B, the method for controlling the mobile terminal provided by the examples of the present disclosure may include as follows.

The user folds the phone.

The hinge sensor(s) estimate(s) the angle to be unfolded, and determines the length of time to play the pending animation/audio.

Based on the length of time, a linear mapping is made between the playback rate of the animation/audio and the unfolding rate of the mobile terminal corresponding to the length of time, and then the animation playback rate and the audio playback rate is calculated.

The animation is played at the animation playback rate, and the audio is played at the audio playback rate.

Figure 7:
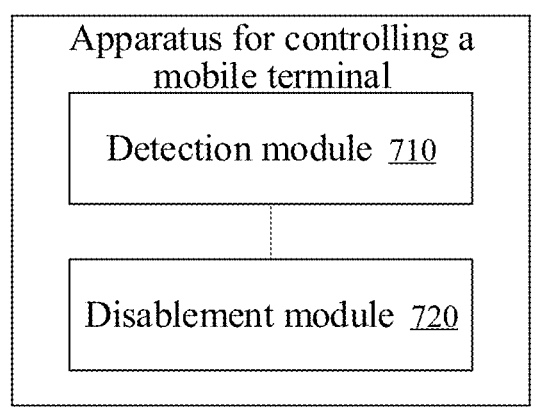
FIG. 7 illustrates a schematic structural diagram of an apparatus for controlling a mobile terminal according to one or more examples of the present disclosure.

As shown in FIG. 7, the examples of the present disclosure provides an apparatus for controlling a mobile terminal, which is applied to a mobile terminal with a touch screen, and the apparatus includes: a detection module 710, configured to detect whether the mobile terminal is in a folding process of switching from an unfolded posture to a folded posture; and a disablement module 720, configured to disable, in response to detecting a touch event acting on the touch screen during the folding process, a response to the touch event.

In some examples, the detection module 710 and disablement module 720 may include program modules. The program modules, when executed by the processor, can implement the functions of any of the above modules.

In some examples, the detection module 710 and disablement module 720 may include hardware and software combination modules. The hardware and software combination modules include, but are not limited to, programmable arrays. The programmable arrays include, but are not limited to, complex programmable arrays and/or field programmable arrays.

In some examples, the detection module 710 and disablement module 720 may include pure hardware modules. The pure hardware modules include, but are not limited to, specialized integrated circuits.

In some examples, the detection module 710 is further configured to: determine a reduction rate at which a first folding angle of the mobile terminal is reduced to a second folding angle, where the first folding angle corresponds to the unfolding posture, the second folding angle corresponds the folding posture, and the first folding angle is greater than the second folding angle; and determine, in response to the reduction rate reaching a rate threshold, that the mobile terminal is in the folding process.

In some examples, the mobile terminal further includes: rotating shaft module and a sensing module provided on the rotating shaft module; and the rotating shaft module is configured to switch by the mobile terminal from the unfolded posture and the folded posture. The detection module 710 is further configured to: monitor a folding angle of the rotating shaft module detected by the sensing module; and determine the reduction rate according to an angle difference between at least two monitored folding angles and a time difference between monitoring moments of the at least two monitored folding angles.

In some examples, the apparatus further includes: a determining module, configured to determine a folding angle of the mobile terminal during the folding process. The disablement module is further configured to disable, in response to detecting the touch event acting on the touch screen upon the folding angle of the mobile terminal being less than or equal to an angle threshold during the folding process, the response to the touch event.

In some examples, the touch event comprises at least one of following: an application startup event triggered by a touch operation acting on an application icon in a desktop of the touch screen; an application service event triggered by a touch operation acting on an application control in an application interface of the touch screen; a shortcut touch event triggered by a shortcut gesture acting on the touch screen.

In some examples, the apparatus further includes: an output module, configured to output, based on a switching parameter generated in a posture switching process of switching by the mobile terminal between the folded posture and the unfolded posture, multimedia information during the posture switching process.

In some examples, the output module is further configured to: play, according to a switching rate during the posture switching process, a switching animation on the touch screen at a playback rate corresponding to the switching rate; or output, according to the switching rate during the posture switching process, a beep at the playback rate corresponding to the switching rate.

In some examples, the output module is further configured to: play, during an unfolding process of switching by the mobile terminal from the folded posture to the unfolded posture, the switching animation on the touch screen at a playback rate corresponding to an unfolding rate of the mobile terminal.

In some examples, the output module is further configured to: output, during the folding process of switching by the mobile terminal from the unfolded posture to the folded posture, the beep at a playback rate corresponding to a folding rate of the mobile terminal.

The examples of the present disclosure provide a mobile terminal, which includes a memory for storing one or more executable instructions for a processor; and the processor connected to the memory. The processor is configured to perform the method for controlling the mobile terminal provided by any of the preceding technical solutions.

The processor may include various types of storage media that are non-transitory computer storage media that are capable of continuing to remember to store information on the communication device after it has been powered down.

The mobile terminal includes, but is not limited to, various mobile terminals or fixed terminals such as cell phones, tablets or projection devices.

The processor may be connected to the memory via a bus or the like for reading an executable program stored on the memory, for example, capable of executing at least one of the methods as shown in any of FIG. 1 to FIG. 5, FIG. 6A to FIG. 6B.

Figure 8:
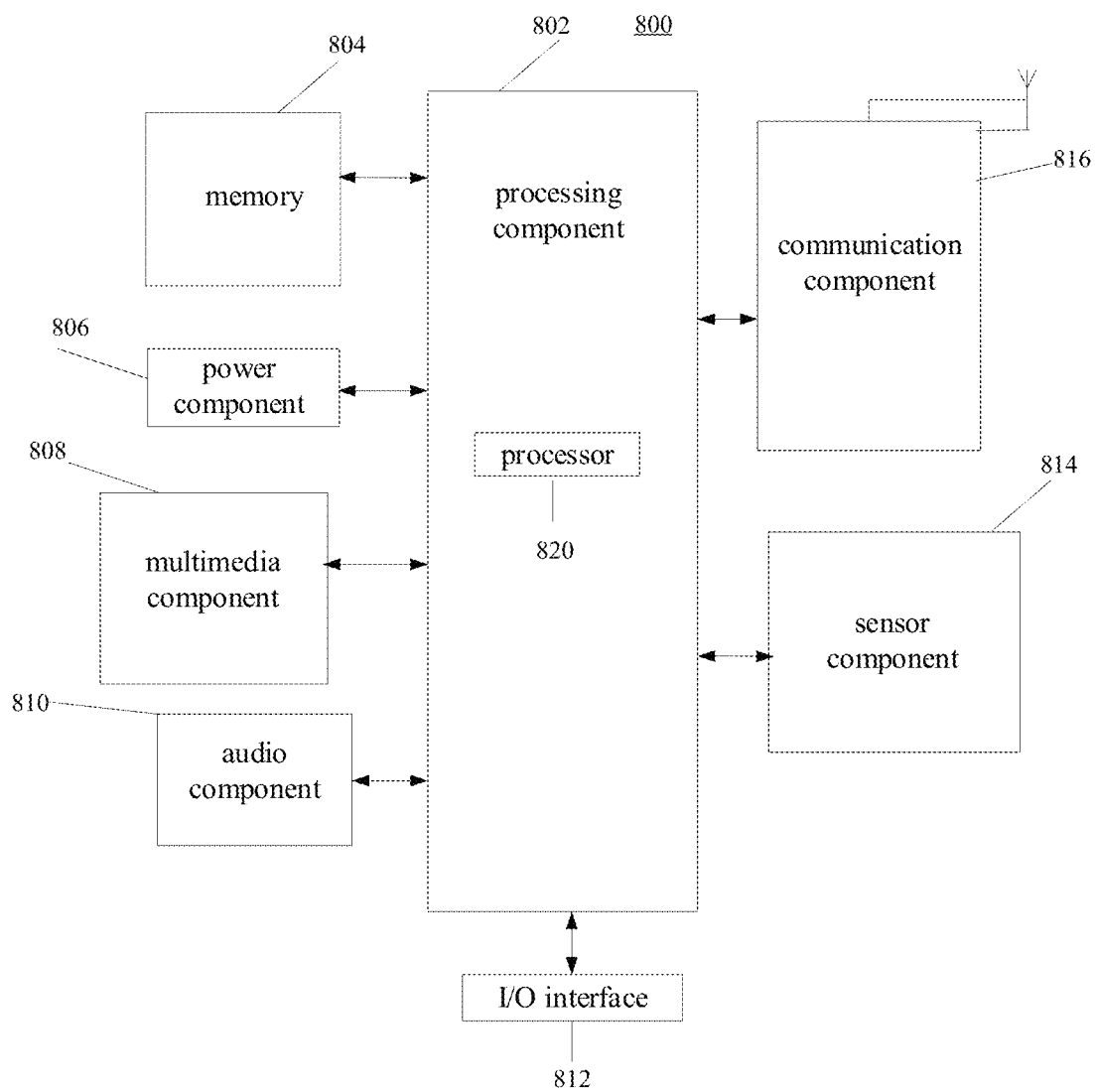
FIG. 8 illustrates a schematic structural diagram of a mobile terminal according to one or more examples of the present disclosure.

FIG. 8 illustrates a block diagram of a mobile terminal 800 according to an exemplary example. For example, the mobile terminal 800 may be a mobile phone or a mobile computer.

Referring to FIG. 8, the mobile terminal 800 may include one or more of the following components: processing component 802, memory 804, power component 806, multimedia component 808, audio component 810, and interface 812 for input/output (I/O), sensor component 814 and communication component 816.

The processing component 802 typically controls the overall operation of the mobile terminal 800, such as operations associated with display, telephone call, data communication camera operation, and recording operations. The processing component 802 may include one or more processors 820 to execute instructions to complete all or some of the steps of the method for controlling the mobile terminal described above. In addition, processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operation at the mobile terminal 800. Examples of such data include instructions for any application or method to operate on the mobile terminal 800, contact data, phonebook data, messages, pictures, videos, and the like. The memory 804 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), and magnetic memory, flash memory Disk or CD-ROM.

The power component 806 provides power to various components of the mobile terminal 800. The power component 806 may include a power management system, one or more power supplies, and other components associated with generating, managing, and distributing power for the mobile terminal 800.

The multimedia component 808 includes a screen that provides an output interface between the mobile terminal 800 and a user. In some examples, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensors may not only sense the boundaries of the touch or swipe action, but also detect the duration and pressure associated with said touch or swipe action. In some examples, the multimedia component 808 includes a front-facing camera and/or a rear-facing camera. The front camera and/or rear camera may receive external multimedia data when the device 800 is in an operating mode, such as a shooting mode or a video mode. Each front camera and rear camera may be a fixed optical lens system or have a focal length and optical zoom capability.

The audio component 810 is configured to output and/or input an audio signal. For example, the audio component 810 includes a microphone (MIC) configured to receive external audio signals when the mobile terminal 800 is in an operating mode, such as a call mode, a recording mode, and a voice recognition mode. The received audio signal may be further stored in memory 804 or sent via communication component 816. In some examples, audio component 810 further includes a speaker for outputting an audio signal.

The I/O interface 812 provides an interface between the processing component 802 and a peripheral interface module. The peripheral interface module may be a keypad, click wheel button, etc. These buttons may include, but are not limited to, a home button, a volume button, a start button and a lock button.

The sensor component 814 includes one or more sensors for providing a status assessment of various aspects of the mobile terminal 800. For example, sensor component 814 may detect the open/closed state of device 800, relative positioning of components, such as the components being a display and keypad of mobile terminal 800, sensor component 814 may also detect a change in position of mobile terminal 800 or a component of mobile terminal 800, the presence or absence of user contact with mobile terminal 800, orientation or acceleration/deceleration of the mobile terminal 800 and a change in temperature of the mobile terminal 800. The sensor component 814 may include a proximity sensor configured to detect the presence of a nearby object in the absence of any physical contact. The sensor component 814 may also include a light sensor, such as a CMOS or CCD image sensor, for use in an imaging application.

In some examples, the sensor component 814 may also include an acceleration sensor, a gyroscope sensor, a magnetic sensor, a pressure sensor, or a temperature sensor.

The communication component 816 is configured to facilitate communication between the mobile terminal 800 and other devices by wired or wireless means. The mobile terminal 800 may access a wireless network based on a communication standard, such as WiFi, 2G or 3G, or a combination thereof. In some examples, communication component 816 receives a broadcast signal or broadcast-related information from an external broadcast management system via a broadcast channel. In some examples, the communication component 816 further includes a near-field communication (NFC) module to facilitate short-range communication. For example, in the NFC module may be implemented based on radio frequency identification (RFID) technology, infrared data association (IrDA) technology, ultra-wideband (UWB) technology, Bluetooth (BT) technology, and other technologies.

In some examples, the mobile terminal 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In some examples, there is also provided a non-transitory computer readable storage medium including one or more instructions, such as a memory 804 including one or more instructions, the one or more instructions being executable by a processor 820 of the mobile terminal 800 to accomplish the direction indication method described above. For example, the non-transitory computer readable storage medium may be ROM, random access memory (RAM), CD-ROM, magnetic tape, floppy disk, and optical data storage devices, among others.

Examples of the present disclosure provide a non-transitory computer readable storage medium that, when the instructions in the storage medium are executed by a processor of a mobile terminal, enables the mobile terminal to execute the method for controlling the mobile terminal provided in any of the preceding examples, for example, to execute at least one of the methods as shown in any of FIG. 1 to FIG. 5, FIG. 6A to FIG. 6B.

The method for controlling the mobile terminal, applied to the mobile terminal with a touch screen, the method includes: detecting whether the mobile terminal is in a folding process of switching from an unfolded posture to a folded posture; and disabling, in response to detecting a touch event acting on the touch screen during the folding process, a response to the touch event.

In some examples, the detecting whether the mobile terminal is in the folding process includes: determining a reduction rate at which a first folding angle of the mobile terminal is reduced to a second folding angle, where the first folding angle corresponds to the unfolding posture, the second folding angle corresponds to the folding posture, and the first folding angle is greater than the second folding angle; and determining, in response to the reduction rate reaching a rate threshold, that the mobile terminal is in the folding process.

In some examples, the mobile terminal further includes: a rotating shaft module and a sensing module provided on the rotating shaft module; and the rotating shaft module is configured to switch by the mobile terminal from the unfolded posture and the folded posture. The determining the reduction rate includes: monitoring a folding angle of the rotating shaft module detected by the sensing module; and determining the reduction rate according to an angle difference between at least two monitored folding angles and a time difference between monitoring moments of the at least two monitored folding angles.

In some examples, the method further includes: determining a folding angle of the mobile terminal during the folding process; and disabling, in response to detecting the touch event acting on the touch screen upon the folding angle of the mobile terminal being less than or equal to an angle threshold during the folding process, the response to the touch event.

In some examples, the touch event includes at least one of: an application startup event triggered by a touch operation acting on an application icon in a desktop of the touch screen; an application service event triggered by a touch operation acting on an application control in an application interface of the touch screen; a shortcut touch event triggered by a shortcut gesture acting on the touch screen.

In some examples, the method further includes: outputting, based on a switching parameter generated in a posture switching process of switching by the mobile terminal between the folded posture and the unfolded posture, multimedia information during the posture switching process.

In some examples, outputting the multimedia information based on the switching parameter generated in the posture switching process includes: playing, according to a switching rate during the posture switching process, a switching animation on the touch screen at a playback rate corresponding to the switching rate; or outputting, according to the switching rate during the posture switching process, a beep at the playback rate corresponding to the switching rate.

In some examples, the method further includes: playing, during an unfolding process of switching by the mobile terminal from the folded posture to the unfolded posture, the switching animation on the touch screen at a playback rate corresponding to an unfolding rate of the mobile terminal.

In some examples, the method further includes: outputting, during the folding process of switching by the mobile terminal from the unfolded posture to the folded posture, the beep at a playback rate corresponding to a folding rate of the mobile terminal.

In the examples of the present disclosure, a posture switching between the folded posture and the unfolded posture of the mobile terminal will be detected. In response to detecting the posture switching, the target function module's state switching is also controlled during the switching process according to the mobile terminal's operating state before the switching, so that the functions or services realized by the terminal in different postures are automatically provided without interruption through the state switching of the target function module, and the adaptability is provided in the corresponding posture, which improves the intelligence and user experience of the mobile terminal.

According to a first aspect of the present disclosure, there is provided a method for controlling a mobile terminal, applied to the mobile terminal with a touch screen. The method includes: detecting whether the mobile terminal is in a folding process of switching from an unfolded posture to a folded posture; and disabling, in response to detecting a touch event acting on the touch screen during the folding process, a response to the touch event.

Based on the above solution, the detecting whether the mobile terminal is in the folding process includes: determining a reduction rate at which a first folding angle of the mobile terminal is reduced to a second folding angle, where the first folding angle corresponds to the unfolding posture, the second folding angle corresponds to the folding posture, and the first folding angle is greater than the second folding angle; and determining, in response to the reduction rate reaching a rate threshold, that the mobile terminal is in the folding process.

Based on the above solution, the mobile terminal further includes: a rotating shaft module and a sensing module provided on the rotating shaft module; and the rotating shaft module is configured to switch by the mobile terminal from the unfolded posture and the folded posture. The determining the reduction rate includes: monitoring a folding angle of the rotating shaft module detected by the sensing module; and determining the reduction rate according to an angle difference between at least two monitored folding angles and a time difference between monitoring moments of the at least two monitored folding angles.

Based on the above solution, the method further includes: determining a folding angle of the mobile terminal during the folding process; and disabling, in response to detecting the touch event acting on the touch screen upon the folding angle of the mobile terminal being less than or equal to an angle threshold during the folding process, the response to the touch event.

Based on the above solution, the touch event comprises at least one of following: an application startup event triggered by a touch operation acting on an application icon in a desktop of the touch screen; an application service event triggered by a touch operation acting on an application control in an application interface of the touch screen; a shortcut touch event triggered by a shortcut gesture acting on the touch screen.

Based on the above solution, the method further includes: outputting, based on a switching parameter generated in a posture switching process of switching by the mobile terminal between the folded posture and the unfolded posture, multimedia information during the posture switching process.

Based on the above solution, the outputting the multimedia information based on the switching parameter generated in the posture switching process includes: playing, according to a switching rate during the posture switching process, a switching animation on the touch screen at a playback rate corresponding to the switching rate; or outputting, according to the switching rate during the posture switching process, a beep at the playback rate corresponding to the switching rate.

Based on the above solution, the playing, according to the switching rate during the posture switching process, the switching animation on the touch screen at the playback rate corresponding to the switching rate, includes: playing, during an unfolding process of switching by the mobile terminal from the folded posture to the unfolded posture, the switching animation on the touch screen at a playback rate corresponding to an unfolding rate of the mobile terminal.

Based on the above solution, the outputting, according to the switching rate during the posture switching process, the beep at the playback rate corresponding to the switching rate, includes: outputting, during the folding process of switching by the mobile terminal from the unfolded posture to the folded posture, the beep at a playback rate corresponding to a folding rate of the mobile terminal.

According to a second aspect of the present disclosure, there is provided an apparatus for controlling a mobile terminal direction, applied to the mobile terminal with a touch screen. The apparatus includes: a detection module, configured to detect whether the mobile terminal is in a folding process of switching from an unfolded posture to a folded posture; and a disablement module, configured to disable, in response to detecting a touch event acting on the touch screen during the folding process, a response to the touch event.

Based on the above solution, the detection module is further configured to determine a reduction rate at which a first folding angle of the mobile terminal is reduced to a second folding angle, where the first folding angle corresponds to the unfolding posture, the second folding angle corresponds the folding posture, and the first folding angle is greater than the second folding angle; and determine, in response to the reduction rate reaching a rate threshold, that the mobile terminal is in the folding process.

Based on the above solution, the mobile terminal further includes: rotating shaft module and a sensing module provided on the rotating shaft module; and the rotating shaft module is configured to switch by the mobile terminal from the unfolded posture and the folded posture. The detection module is further configured to: monitor a folding angle of the rotating shaft module detected by the sensing module; and determine the reduction rate according to an angle difference between at least two monitored folding angles and a time difference between monitoring moments of the at least two monitored folding angles.

Based on the above solution, the apparatus further includes: a determining module, configured to determine a folding angle of the mobile terminal during the folding process. The disablement module is further configured to disable, in response to detecting the touch event acting on the touch screen upon the folding angle of the mobile terminal being less than or equal to an angle threshold during the folding process, the response to the touch event.

Based on the above solution, the touch event includes at least one of following: an application startup event triggered by a touch operation acting on an application icon in a desktop of the touch screen; an application service event triggered by a touch operation acting on an application control in an application interface of the touch screen; a shortcut touch event triggered by a shortcut gesture acting on the touch screen.

Based on the above solution, the apparatus further includes: an output module, configured to output, based on a switching parameter generated in a posture switching process of switching by the mobile terminal between the folded posture and the unfolded posture, multimedia information during the posture switching process.

Based on the above solution, the output module is further configured to: play, according to a switching rate during the posture switching process, a switching animation on the touch screen at a playback rate corresponding to the switching rate; or output, according to the switching rate during the posture switching process, a beep at the playback rate corresponding to the switching rate.

Based on the above solution, the output module is further configured to: play, during an unfolding process of switching by the mobile terminal from the folded posture to the unfolded posture, the switching animation on the touch screen at a playback rate corresponding to an unfolding rate of the mobile terminal.

Based on the above solution, the output module is further configured to: output, during the folding process of switching by the mobile terminal from the unfolded posture to the folded posture, the beep at a playback rate corresponding to a folding rate of the mobile terminal.

According to a third aspect of the present disclosure, there is provided a mobile terminal, including: a memory for storing one or more executable instructions for a processor; and the processor connected to the memory. The processor is configured to implement the method for controlling the mobile terminal provided by any technical solution in the first aspect.

According to a fourth aspect of the present disclosure, there is provided a non-transitory computer readable storage medium. When one or more instructions in the storage medium are executed by a processor of a computer, the computer is allowed to execute the method for controlling the mobile terminal provided by any technical solution in the first aspect.

Other examples of the present disclosure will readily come to the mind of those skilled in the art upon consideration of the specification and practice of the invention disclosed herein. The present disclosure is intended to cover any variation, use, or adaptation of the present disclosure that follows the general principles of the present disclosure and includes commonly known or customary technical means in the art that are not disclosed herein. The specification and examples are considered exemplary only, and the true scope and spirit of the present disclosure is indicated by the following claims.

It is to be understood that the present disclosure is not limited to the precise structure already described above and illustrated in the accompanying drawings, and that various modifications and changes may be made without departing from its scope. The scope of the present disclosure is limited only by the appended claims

What is claimed is:

1. A method for controlling a mobile terminal, comprising:
   detecting, by the mobile terminal with a touch screen, whether the mobile terminal is in a folding process of switching from an unfolded posture to a folded posture; and
   disabling, in response to detecting a touch event acting on the touch screen during the folding process, a response to the touch event;
   wherein detecting whether the mobile terminal is in the folding process comprises:
   determining a reduction rate at which a first folding angle of the mobile terminal is reduced to a second folding angle, wherein the first folding angle corresponds to the unfolding posture, the second folding angle corresponds to the folding posture, and the first folding angle is greater than the second folding angle; and
   determining, in response to the reduction rate reaching a rate threshold, that the mobile terminal is in the folding process.

2. The method of claim 1, wherein the mobile terminal further comprises: a rotating shaft and a sensor provided on the rotating shaft; and the rotating shaft is configured to switch by the mobile terminal from the unfolded posture and the folded posture; and
   wherein determining the reduction rate comprises:
   monitoring a folding angle of the rotating shaft detected by the sensor; and
   determining the reduction rate according to an angle difference between at least two monitored folding angles and a time difference between monitoring moments of the at least two monitored folding angles.

3. The method of claim 1, further comprising:
   determining a folding angle of the mobile terminal during the folding process; and
   disabling, in response to detecting the touch event acting on the touch screen upon the folding angle of the mobile terminal being less than or equal to an angle threshold during the folding process, the response to the touch event.

4. The method of claim 1, wherein the touch event comprises at least one of following:
   an application startup event triggered by a touch operation acting on an application icon in a desktop of the touch screen;
   an application service event triggered by a touch operation acting on an application control in an application interface of the touch screen; or
   a shortcut touch event triggered by a shortcut gesture acting on the touch screen.

5. The method of claim 1, further comprising:
   outputting, based on a switching parameter generated in a posture switching process of switching by the mobile terminal between the folded posture and the unfolded posture, multimedia information during the posture switching process.

6. The method of claim 5, wherein outputting the multimedia information based on the switching parameter generated in the posture switching process comprises:
   playing, according to a switching rate during the posture switching process, a switching animation on the touch screen at a playback rate corresponding to the switching rate; or outputting, according to the switching rate during the posture switching process, a beep at the playback rate corresponding to the switching rate.

7. The method of claim 6, wherein playing, according to the switching rate during the posture switching process, the switching animation on the touch screen at the playback rate corresponding to the switching rate comprises:
playing, during an unfolding process of switching by the mobile terminal from the folded posture to the unfolded posture, the switching animation on the touch screen at a playback rate corresponding to an unfolding rate of the mobile terminal.

8. The method of claim 6, wherein outputting, according to the switching rate during the posture switching process, the beep at the playback rate corresponding to the switching rate comprises:
outputting, during the folding process of switching by the mobile terminal from the unfolded posture to the folded posture, the beep at a playback rate corresponding to a folding rate of the mobile terminal.

9. A mobile terminal, comprising:
a memory for storing one or more executable instructions for a processor; and
the processor connected to the memory;
wherein the processor is configured to:
detect whether the mobile terminal is in a folding process of switching from an unfolded posture to a folded posture; and
disable, in response to detecting a touch event acting on the touch screen during the folding process, a response to the touch event;
wherein the processor is further configured to:
determine a reduction rate at which a first folding angle of the mobile terminal is reduced to a second folding angle, wherein the first folding angle corresponds to the unfolding posture, the second folding angle corresponds to the folding posture, and the first folding angle is greater than the second folding angle; and
determine, in response to the reduction rate reaching a rate threshold, that the mobile terminal is in the folding process.

10. The mobile terminal of claim 9, wherein the mobile terminal further comprises: a rotating shaft and a sensor provided on the rotating shaft; and the rotating shaft is configured to switch by the mobile terminal from the unfolded posture and the folded posture; and
wherein the processor is further configured to:
monitor a folding angle of the rotating shaft detected by the sensor; and
determine the reduction rate according to an angle difference between at least two monitored folding angles and a time difference between monitoring moments of the at least two monitored folding angles.

11. The mobile terminal of claim 9, wherein the processor is further configured to:
determine a folding angle of the mobile terminal during the folding process; and
disable, in response to detecting the touch event acting on the touch screen upon the folding angle of the mobile terminal being less than or equal to an angle threshold during the folding process, the response to the touch event.

12. The mobile terminal of claim 9, wherein the touch event comprises at least one of following:
an application startup event triggered by a touch operation acting on an application icon in a desktop of the touch screen;
an application service event triggered by a touch operation acting on an application control in an application interface of the touch screen; or
a shortcut touch event triggered by a shortcut gesture acting on the touch screen.

13. The mobile terminal of claim 9, wherein the processor is further configured to:
output, based on a switching parameter generated in a posture switching process of switching by the mobile terminal between the folded posture and the unfolded posture, multimedia information during the posture switching process.

14. The mobile terminal of claim 13, wherein the processor is further configured to:
play, according to a switching rate during the posture switching process, a switching animation on the touch screen at a playback rate corresponding to the switching rate; or
output, according to the switching rate during the posture switching process, a beep at the playback rate corresponding to the switching rate.

15. The mobile terminal of claim 14, wherein the processor is further configured to:
play, during an unfolding process of switching by the mobile terminal from the folded posture to the unfolded posture, the switching animation on the touch screen at a playback rate corresponding to an unfolding rate of the mobile terminal.

16. The mobile terminal of claim 14, wherein the processor is further configured to:
output, during the folding process of switching by the mobile terminal from the unfolded posture to the folded posture, the beep at a playback rate corresponding to a folding rate of the mobile terminal.

17. A non-transitory computer-readable storage medium, when one or more instructions in the storage medium are executed by a processor of a mobile terminal, enabling the mobile terminal to:
detect whether the mobile terminal is in a folding process of switching from an unfolded posture to a folded posture by:
determining a reduction rate at which a first folding angle of the mobile terminal is reduced to a second folding angle, wherein the first folding angle corresponds to the unfolding posture, the second folding angle corresponds to the folding posture, and the first folding angle is greater than the second folding angle; and
determining, in response to the reduction rate reaching a rate threshold, that the mobile terminal is in the folding process; and
disable, in response to detecting a touch event acting on the touch screen during the folding process, a response to the touch event.

* * * * *